United States Patent [19]

Naae et al.

[11] Patent Number: 5,100,567

[45] Date of Patent: * Mar. 31, 1992

[54] SHEAR-THICKENING SOLUTIONS WITH HYDROXYPROPYL CELLULOSE

[75] Inventors: Douglas G. Naae, Houston; Lawrence E. Whittington, Katy, both of Tex.

[73] Assignee: Texaco Inc., White Plains, N.Y.

[*] Notice: The portion of the term of this patent subsequent to Dec. 31, 2008 has been disclaimed.

[21] Appl. No.: 620,687

[22] Filed: Dec. 3, 1990

[51] Int. Cl.$^5$ .................. E21B 43/26; E21B 43/22
[52] U.S. Cl. .................. 252/8.551; 252/855.4; 252/315.3; 523/130; 166/274; 166/275; 166/273; 166/308
[58] Field of Search ........... 252/8.51, 8.511, 8.512, 252/8.513, 8.514, 8.551, 8.554, 315.3; 523/130; 166/273, 274, 275, 308

[56] References Cited

U.S. PATENT DOCUMENTS

| | | | |
|---|---|---|---|
| 3,578,781 | 12/1968 | Abrams et al. | 166/305 |
| 3,638,728 | 2/1972 | Hill | 166/273 |
| 3,675,716 | 7/1972 | Farmer, Jr. et al. | 166/275 |
| 3,792,731 | 2/1974 | Fuerbacher et al. | 166/274 |
| 3,989,534 | 11/1976 | Plungulan et al. | 106/86 |
| 4,141,766 | 2/1979 | Cameron | 149/2 |
| 4,340,492 | 7/1982 | Stournas | 252/8.554 |
| 4,646,834 | 3/1987 | Bannister | 166/291 |
| 4,694,906 | 9/1987 | Hutchins et al. | 166/294 |

*Primary Examiner*—Robert L. Stoll
*Assistant Examiner*—Chhaya Sayala
*Attorney, Agent, or Firm*—Jack H. Park; Kenneth R. Priem; Harold J. Delhommer

[57] ABSTRACT

The invention is an aqueous shear-thickening composition comprising in one embodiment about 0.2% to about 1% by weight of hydroxypropyl cellulose having an average molecular weight between about 1,000,000 and about 1,300,000, about 0.1% to about 0.7% by weight of an alkali metal dodecyl sulfate in a ratio of about 2.5:1 to about 1.5:1 hydroxypropyl cellulose to alkali metal dodecyl sulfate, and water containing less than about 2000 ppm TDS.

22 Claims, No Drawings

SHEAR-THICKENING SOLUTIONS WITH HYDROXYPROPYL CELLULOSE

BACKGROUND OF THE INVENTION

The present invention relates to a shear-thickening solution containing hydroxypropyl cellulose. More particularly, the invention concerns a composition which will increase in viscosity upon shear under certain conditions comprising hydroxypropyl cellulose and sodium dodecyl sulfate or certain alkylbenzene sulfonates.

Most hydrocarbons and aqueous solutions exhibit Newtonian behavior. Most polymer solutions exhibit shear-thinning behavior, wherein the application of shear to the solution decreases solution viscosity. The principle reason for this behavior is due to the large volume which a single polymeric chain can occupy within the solvent. An increase in the size of the chain produces an increase in solution viscosity. Shearing decreases the size and length of the polymer chains in solution which give the added viscosity to the solution.

Some polymer solutions, however, are known to exhibit shear-thickening behavior if they are prepared in certain concentration ranges. In these cases, viscosity increases upon the application of shear.

Several uses have been developed for solutions having the unusual property of the shear-thickening. Oil production uses abound, including well control fluids, viscosifiers for oil recovery, workover fluids, hydraulic fracturing fluids, mobility control fluids and permeability reduction fluids. Non-petroleum production uses include anti-misting additives for jet fuel (U. S. Statutory Invention Registration H363 and West German No. 3,439,796), grease additives (U.S. Pat. No. 4,132,658), pastes for printing (Poland No. 94,623) and consumer products such as toothpaste (U.S. Pat. No. 4,313,765 and Japan No. 58,062,108 A2).

U.S. Pat. Nos. 4,096,326; 4,313,765 and 4,524,003 disclose shear-thickening compositions useful as general viscosifying agents. U.S. Pat. No. 4,096,326 discloses that water soluble dihydroxypropyl ethers of cellulose form shear-thickening compositions. U.S. Pat. No. 4,313,765 teaches a shear-thickening blend of cellulase-free xanthan gum with a number of cellulose compounds, including carboxymethyl cellulose, hydroxyethyl cellulose and hydroxypropylmethyl cellulose. U.S. Pat. No. 4,524,003 discloses a shear-thickening mixture of at least one member selected from the group consisting of (1) sulfonated guar and a compound comprising at least one member selected from the group consisting of xanthan gum, guar, hydroxpropyl guar or derivatives, hydroxyethyl cellulose or derivatives, and (2) cationic guar and a compound comprising at least one member selected from the group of hydroxypropyl guar or derivatives and hydroxyethyl cellulose or derivatives.

Well control and workover fluids provide a fertile field for the use of shear-thickening compounds. U.S. Pat. No. 3,523,581 claims the use of a mixture of a shear-thickening compound and a sacrificial agent in an enhanced oil recovery process, wherein the shear-thickening/sacrificial agent solution is injected into a reservoir followed by the injection of a driving fluid.

Shear-thickening well control fluids containing clay are disclosed in U.S. Pat. Nos. 4,542,791; 4,663,366 and 4,683,953. U.S. Pat. No. 4,542,791 teaches plugging a porous formation in a wellbore with a water-in-oil emulsion. The continuous phase has granular bentonite and a polyamine surfactant. The aqueous phase contains a solution of a polyacrylamide and a polycarboxylate acid. U.S. Pat. No. 4,683,953 teaches clay with a polyacrylic acid and polyacrylamide. U.S. Pat. No. 4,663,366 employs polycarboxylic acid.

Two other variations of shear-thickening fluids for petroleum production are disclosed in U.S. Pat. Nos. 4,212,747 and 4,289,203. The shear-thickening fluids are said to be useful for mobility control, water diversion, hydraulic fracturing and workover fluids. Both patents disclose the reaction product of a high molecular weight polyalkylene oxide and a synthetic resin produced from aldehydes and phenols in an alkaline environment. U.S. Pat. No. 4,244,826 discloses gelled acidic compositions for acid treating by mixing cellulose ethers or polyacrylamides with an acid and gelling the composition by adding an aldehyde and a phenolic.

Hydroxypropyl cellulose has been evaluated for different uses in the oil field. It has been screened for polymer flooding applications, but has not been used extensively because of its generally higher cost. See Szabo, M. T., "An Evaluation of Water-Soluble Polymers for Secondary Oil Recovery-Part One," *Journal of Petroleum Technology*, 1979, page 553–560.

Gel systems have been formulated using hydroxypropyl cellulose and a suitable cross-linking agent such as titanium, zirconium or antimony. U.S. Pat. Nos. 4,378,049; 4,553,601 and 4,679,645 all disclose gel systems with cross-linking agents.

U.S. Pat. No. 4,627,494 describes a method of using hydroxypropyl cellulose as a sacrificial agent for surfactant floods. Water-soluble suspensions of hydroxypropyl cellulose and other polymers are disclosed in European Patent Application No. 81301140.0.

British Petroleum has published a report that describes their efforts to develop a "sea water-soluble precipitable polymer" for use in the North Sea. A large slug of hydroxypropyl cellulose was required to achieve a small permeability reduction. See Graham, D. E. et al., "Treatment Fluids to Improve Sea Water Injection," *New Technologies for the Exploration and Exploitation of Oil and Gas Resources*, Graham and Trotman, Volume Two, 1984, page 860–872.

U.S. Pat. No. 4,169,818 and 4,172,055 disclose the use of hydroxypropyl cellulose with polymaleic and hydroxy derivatives to form a fluid with increased viscosity. The references disclose use as a hydraulic fluid in well drilling operations.

An invention method for decreasing formation permeability around a wellbore is disclosed in U.S. patent application Ser. No. 579,139, filed Sept. 7, 1990. This invention employs hydroxypropyl cellulose and an alkali metal dodecy sulfate in the ratio of about 3:1 to about 1:1.5 of cellulose to sulfate. A brine having a salinity greater than about 10,000 ppm TDS is required to mix and react with the aqueous solution to form a gel. The mixing of the hydroxypropyl cellulose, alkali metal dedecyl sulfate and brine forms a high viscosity gel useful for decreasing formation permeability. Gels formed by this invention method are not shear-thickening.

SUMMARY OF THE INVENTION

The invention is an aqueous shear-thickening composition comprising about 0.2% to about 1% by weight of hydroxypropyl cellulose having an average molecular weight between about 1,000,000 and about 1,300,000, about 0.1% to about 0.7% by weight of an alkali metal dodecyl sulfate in a ratio of about 2.5:1 to about 1.5:1 hydroxypropyl cellulose to alkali metal dodecyl sulfate, and water containing less than about 2000 ppm TDS. The amount of hydroxypropyl cellulose and alkali metal dodecyl sulfate is not included in the maximum figure for total dissolved solids in water.

In another embodiment, the aqueous shear-thickening composition comprises about 0.2% to about 1% by weight hydroxypropyl cellulose having an average molecular weight between about 1,000,000 and about 1,300,000, about 0.1% to about 1% of an alkali metal alkylbenzene sulfonate having between 8 and 12 carbon atoms in the alkyl chain in a ratio of about 2.5:1 to about 0.9:1 hydroxypropyl cellulose and alkali metal alkylbenzene sulfonate and water containing less than about 2000 ppm TDS. A third embodiment employs hydroxypropyl cellulose having a lower molecular weight of between 800,000 and 900,000 in a concentration of about 0.2% to about 1% by weight with about 0.1% to about 1% by weight of alkali metal dodecyl sulfate in a ratio of about 2.5:1 to about 0.9:1 of hydroxypropyl cellulose and alkali metal dodecyl sulfate. This third embodiment requires the presence of water containing at least 15,000 ppm TDS in addition to the hydroxypropyl cellulose and the alkali metal dodecyl sulfate.

DETAILED DESCRIPTION

A shear-thickening composition means that the application of sufficient shear to the composition of this invention will result in increased viscosity of the composition or solution. Frequently the viscosity increase will be sufficient to surpass a paste-like condition to form a solid gel. The strength and integrity of the gel may be a function of the intensity and duration of the shear forces employed, but the concentration of ingredients is generally more important.

The invention compositions described herein contain water, a high molecular weight hydroxypropyl cellulose, and an alkali metal dodecyl sulfate or an alkali metal alkylbenzene sulfonate, and for one embodiment, brine. These compositions are highly viscoelastic. They are fluid in a quiescent state, but assume a gel-like character on the application of shear. After shear ceases, the gel-like character disappears over time and the composition returns to its original fluid state.

Fluids exhibiting such shear-thickening behavior are well recognized in the art and are useful as workover fluids in production or injection wells, as water diversion agents and mobility control agents in oil recovery operations, as hydraulic fracturing fluids, and for acid treating of wells or underground formations. This behavior of returning to the original fluid state makes the shear-thickening compositions ideal as temporary plugging or permeability control agents.

As water diversion agents and mobility control fluids, the invention compositions can be injected at injection wells to control the permeability profile of a formation or for mobility control in oil recovery operations. Such compositions can function by temporarily plugging "thief zones," directing the subsequently injected drive fluids to the less permeable, relatively oil-rich zones. The compositions can also function as mobility control fluids in surfactant flooding by use as viscous driving slugs to push the previously injected surfactant slug and recovered oil to a producing well.

Hydraulic fracturing is another possible use for shear-thickening compositions. The injection of a suitable fluid under sufficient pressure into a formation fractures the formation and provides a passageway to facilitate the flow of fluids through the formation into the well. Propping agents can be included in the shear-thickening compositions if desired.

A common problem in hydraulic fracturing involving the use of water based compositions is the excessive loss of fluids to the formation. Such fluid loss can prevent the attainment of sufficiently high pressures necessary to fracture selected zones. The fluid lost to the formation can be lessened by adding a shear-thickening fluid as disclosed herein.

The shear-thickening compositions of the present invention in one embodiment comprise about 0.2% to about 1%, preferably about 0.3% to about 0.7% by weight of hydroxypropyl cellulose having an average molecular weight between about 1,000,000 and about 1,300,000, about 0.1% to about 0.7%, preferably about 0.2% to about 0.4% by weight of alkali metal dodecyl sulfate in a ratio of about 2.5:1 to about 1.5:1 hydroxypropyl cellulose to alkali metal dodecyl sulfate, and water containing less than about 2000 ppm TDS, preferably less than about 1000 ppm TDS, and most preferably less than about 500 ppm TDS. These amounts of total dissolved solids in the water do not include the hydroxypropyl cellulose or alkali metal dodecyl metal sulfate. The alkali metal dodecyl sulfate is preferably sodium dodecyl sulfate, but the alkali metal in the compound may also be potassium, lithium or other alkali metals.

A second embodiment involves the substitution of an alkali metal alkylbenzene sulfonate for the alkali metal dodecyl sulfate of the first embodiment. This substitution changes the required concentration range of surfactant from the 0.1% to about 0.7% of alkali metal dodecyl sulfate to a range of about 0.1% to about 1% by weight of an alkali metal alkylbenzene sulfonate. Further, the ratio range of cellulose to surfactant changes with the sulfonate substitution to a range of about 2.5:1 to about 0.9:1 cellulose to sulfonate. Laboratory tests indicate that a 1:1 ratio of cellulose to sulfate will not form a shear-thickening composition, whereas a 1:1 ratio of cellulose to the alkali metal alkylbenzene sulfonate will form a shear-thickening composition.

A third embodiment involves the use of a hydroxypropyl cellulose having a lower molecular weight. Upon the substitution of hydroxypropyl cellulose having an average molecular weight between about 800,000 and 900,000 for the hydroxypropyl cellulose of the first embodiment creates a composition which will not be shear-thickening unless a brine is added to the composition. This third embodiment comprises about 0.2% to about 1%, preferably about 0.3% to about 0.7% by weight of hydroxypropyl cellulose having an average molecular weight between about 800,000 and 900,000, about 0.1% to about 1%, preferably about 0.3% to about 0.7% by weight of an alkali metal dodecyl sulfate in a ratio of about 2.5:1 to about 0.9:1 of cellulose to sulfate, and water containing at least 15,000 ppm TDS, preferably at least 20,000 ppm TDS, excluding the cellulose and sulfate. Testing indicated that the different molecular weight of cellulose would not form a shear-thickening composition without the presence of brine.

Hydroxypropyl cellulose is a water-soluble non-ionic cellulose polyether formed by the reaction of cellulose with propylene oxide. It is a commercial product manufactured and sold in several molecular weight ranges. The molecular weight found most effective for the instant gel invention is a molecular weight averaging over 1,000,000.

Sodium dodecyl sulfate is an anionic surfactant produced by the sulfation of dodecyl alcohol. It is a commercial product manufactured by several companies. 1988 production was over 24,000,000 pounds.

Hydroxypropyl cellulose is readily soluble in cold water. However, the polymer precipitates from solution when the temperature is raised to 40°–45° C. The solution first turns cloudy, and then forms a swollen precipitate as the hydroxypropyl cellulose comes out of solution. The addition of ionic surfactants such as an alkali metal dodecyl sulfate to a solution of hydroxypropyl cellulose can raise the normal cloud point to 90° C. This seems to be the practical temperature limit for the invention method.

It is theorized that the unusual shear-thickening behavior of the invention compositions is due to a change between intramolecular and intermolecular associations between the polymer chains. It is believed that the polymer moleculars have primarily intramolecular associations when the solution is at rest. These intramolecular associations are broken and the polymer molecule extends due to the shear. New intermolecular associations are then formed and these may be responsible for increases in viscosity of the solutions. For example, sulfonated polystyrene is a flexible-chain polymer with widely spaced anionic groups that strongly attacked each other. Shearing elongates the polymer which leads to more intermolecular contacts between the sulfonate groups. This causes solution viscosity to rise.

For the invention shear-thickening systems, it is believed that the sodium dodecyl sulfate or alkali metal alkylbenzene sulfonate of the second embodiment binds strongly to the hydroxypropyl cellulose, with mixed micelle formation occurring. The sodium dodecyl sulfate is associated with the hydroxypropyl cellulose at regularly occurring intervals. In addition, the sulfonate groups of the sodium dodecyl sulfate are strongly attracted to each other.

When shear occurs for this system, the intramolecular associations between the sulfonate groups are broken and the hydroxypropyl cellulose polymer is elongated. The sodium dodecyl sulfate continues to be bound to the cellulose chains and new intermolecular contacts are formed between the sulfonate groups. This increases the viscosity and is responsible for gel formation.

Once the shear flow is stopped, the solution begins a relaxation process. It is believed that the sulfonate groups strongly attracted to each other undergo a dynamic exchange process and begin to associate with other sulfonate groups. The result is that the sulfonate interaction slowly changes from an intermolecular arrangement to an intramolecular attraction. The cellulose polymer chains also relax and change from the confirmation induced by the shearing to a normal molecular shape that is more folded and jumbled, permitting more intramolecular associations between the sulfonate groups of the sodium dodecyl sulfate. The result is viscosity decreases and assumes a value more typical of a polymer/surfactant solution.

The role of brine in the gel formation can be theorized by salt increasing the dielectric constant of the water solution. When the cellulose, sulfate and brine are first mixed, the mixing causes enough shearing to establish the necessary molecular confirmations to form the intermolecular contacts between the sulfonate groups. These intermolecular associations raise the viscosity. However, the brine has raised the dielectric constant of the solution and the sulfonates may be shielded from each other. Dynamic exchange between the sulfonates may not occur or occurs slowly, and the solution and polymer do not relax. The result is that viscosity stays high and the strength of the gel is maintained. In contrast, if the brine is not present, the solution and polymer will relax and the viscosity falls to a low level after a few days.

It should be emphasized that the above explanation is theory only. Applicants are unsure of the reasons why the invention shear-thickening compositions behave in such a manner. This explanation is offered only as a possible reason for the unusual shear-thickening behavior of the invention compositions.

It should also be noted that the shear-thickening effect of the invention compositions is highly dependent upon the alkyl chain length of the sulfate or sulfonate surfactant. Chain lengths shorter or longer than the dodecyl chain of sodium dodecyl sulfate did not exhibit shear-thickening. More specifically, solutions with ten and 14 carbon chain lengths failed to exhibit shear-thickening. This behavior provides some reinforcement to the theory in that it emphasizes that the various chains have to fit together in exactly the right locations. Specific structures are needed. The same is true for the second embodiment with alkali metal alkylbenzene sulfonate. Although the octylbenzene sulfonate and dodecylbenzene sulfonate formed shear-thickening compositions, it is believed that alkyl chain lengths of 6 or 14 carbons will not work effectively.

The molecular weight of the hydroxypropyl cellulose is a significant factor in these shear-thickening compositions. The examples indicate that the shear-thickening solutions were formed with the hydroxypropyl cellulose having a molecular weight of about 1,150,000 only in fresh water. When brine was added to these systems, a gel was formed which did not later relax. Shear-thickening behavior was not observed. The advanced theory states that the brine prevents the thinning of viscosity when the solution is at rest. However, when a hydroxypropyl cellulose with an average molecular weight of about 850,000 was used, shear-thickening was mild and only seen when brine was present. The relative concentrations of cellulose to surfactant required for the shear-thickening compositions also changed with the changing molecular weight of the cellulose.

The following examples will further illustrate the novel shear-thickening compositions of the present invention. These examples are given way of illustration and not as limitations on the scope of the invention. Thus, it should be understood that the makeup of the compositions may be varied to achieve similar results within the scope of the invention.

EXAMPLES 1-13

Solutions of hydroxypropyl cellulose (HPC), and sodium dodecyl sulfate (SDS), sodium octylbenzene sulfonate (SOBS) or sodium dodecyl benzene sulfonate (SDBS) were mixed with and without brine in bottles to investigate the effect of concentration and salinity on the production of shear-thickening compositions.

The hydroxypropyl cellulose employed in all examples except Example 6 had an average molecular weight of about 1,150,000 and a viscosity of 190 cps for 0.5% solution in water, Brookfield Viscometer at 6 rpm (UL adaptor). It was obtained under the trademark Klucel-H from Aqualon, Inc. The hydroxypropyl cellulose used in Example 6 had an average molecular weight of about 850,000 and a viscosity of 52 cps for a 0.5% solution in water, Brookfield viscometer at 6 rpm ULP adaptor. It was obtained under the trademark Klucel-M from Aqualon, Inc.

Brine was added to the solutions using sodium chloride without divalent cations. Viscosities were measured on a Brookfield viscometer. The UL adaptor at 6 rpm was used for low values, and spindle #2 at 0.6 rpm was used for high values.

TABLE 1

| | Shear Thickening Solutions | | | | | |
|---|---|---|---|---|---|---|
| | % | % Sur- | Brine. | | Viscosity. cp | |
| Ex. | HPC[1] | factant | TDS | Surfactant[2] | Quiet | Shear |
| 1 | 0.5 | 0.25 | 0 | SDS | 80 | 10,400 |
| 2 | 0.25 | 0.25 | 0 | SDS | | 6[3] |
| 3 | 0.5 | 0.5 | 0 | SDS | | 14[3] |
| 4 | 0.5 | 0.5 | 9,100 | SDS | | 70,000[3] |
| 5 | 0.5 | 0.25 | 9,100 | SDS | | 99,000[3] |
| 6 | 0.5[4] | 0.5 | 18,300 | SDS | 270 | 1,600 |
| 7 | 0.25 | 0.25 | 0 | SOBS | 270 | 3,900 |
| 8 | 0.5 | 0.25 | 0 | SOBS | 23,000 | 30,000 |
| 9 | 0.5 | 0.25 | 9,100 | SOBS | phase unstable | |
| 10 | 0.25 | 0.25 | 18,300 | SOBS | phase unstable | |
| 11 | 0.25 | 0.25 | 0 | SDBS | 800 | 5,040 |
| 12 | 0.25 | 0.25 | 36,600 | SDBS | Cloudy Solution | |
| 13 | 0.5 | 0.25 | 9,100 | SDBS | | 27,000[3] |

[1]HPC = hydroxypropyl cellulose with molecular weight of 1,150,000 (Klucel-H).
[2]SDS = sodium dodecyl sulfate; SOBS = sodium n-octylbenzene sulfonate; SDBS = sodium dodecylbenzene sulfonate.
[3]No shear-thickening behavior.
[4]Hydroxypropyl cellulose with molecular weight of 850,000 (Klucel-M).

An examination of Table 1 indicates that shear-thickening occurs in the absence of brine with the cellulose of higher molecular weight (Klucel-H). In Example 1, viscosity of the quiet solution (before shearing) was 80 cp. After shearing, solution viscosity rose to 10,400 cp.

Examples 2 and 3 with sodium dodecyl sulfate and without brine did not form gels or shear-thickening solutions. They fit the requirements of the invention composition except for the one to one ratio of cellulose to surfactant. When brine was added to the system in Examples 4 and 5, high viscosity gels were formed which did not have shear-thickening properties. Other testing was performed on systems similar to Examples 1-5 wherein the alkyl chain length of the surfactant was shorter and longer than the 12 carbon chain of sodium dodecyl sulfate. All of these tests failed to form shear-thickening solutions.

When the lower molecular weight cellulose Klucel-M was employed in Example 6, a shear-thickening solution was formed only with the addition of brine. Viscosity of the quiet solution was 270 cp. After shearing, solution viscosity rose to 1600 cp. This composition also formed with a one to one ratio of cellulose to surfactant, a ratio which would not form a shear-thickening solution with the Klucel-H cellulose. It is believed this behavior is due to the lower molecular weight of the Klucel-M polymer.

Examples 7-13 were conducted with sodium n-octylbenzene sulfonate and sodium dodecylbenzene sulfonate. Two observations should be made. First, when brine was added to the solutions, shear-thickening compositions did not form. Second, shear-thickening compositions did form with 1:1 ratios of cellulose to surfactant. See Examples 7 and 11.

The method of the present invention may be subjected to many modifications and changes by those skilled in the art without departing from the spirit or essential characteristics of the present invention. Accordingly, it should be completely understood that the concepts disclosed in the description are illustrative only, and are not intended as limitations on the scope of the invention.

What is claimed is:

1. An aqueous shear-thickening composition comprising:
   about 0.2% to about 1% by weight of hydroxypropyl cellulose having an average molecular weight between about 1,000,000 and about 1,300,000;
   about 0.1% to about 0.7% by weight of an alkali metal dodecyl sulfate in a ratio of about 2.5:1 to about 1.5:1 hydroxypropyl cellulose to alkali metal dodecyl sulfate; and
   water containing less than about 2000 ppm total dissolved solids.

2. The composition of claim 1, wherein the ratio of hydroxypropyl cellulose to alkali metal dodecyl sulfate is about 2.25:1 to about 1.75:1.

3. The composition of claim 1, wherein the water contains less than about 1000 ppm total dissolved solids.

4. The composition of claim 1, wherein the water contains less than about 500 ppm total dissolved solids.

5. The composition of claim 1, wherein the alkali metal dodecyl sulfate is sodium dodecyl sulfate.

6. The composition of claim 1, wherein the hydroxypropyl cellulose is present in a concentration of about 0.3% to about 0.7% by weight.

7. The composition of claim 1, wherein the alkali metal dodecyl sulfate is present in a concentration of about 0.2% to about 0.4% by weight.

8. An aqueous shear-thickening composition, comprising:
   about 0.4% to about 0.7% by weight of hydroxypropyl cellulose having an average molecular weight between about 1,000,000 and about 1,300,000;
   about 0.2% to about 0.4% by weight of sodium dodecyl sulfate in a ratio of about 2.25:1 to about 1.75:1 hydroxypropyl cellulose to sodium dodecyl sulfate; and
   water containing less than about 1000 ppm total dissolved solids.

9. An aqueous shear-thickening composition, comprising:
   about 0.2% to about 1% by weight of hydroxypropyl cellulose having an average molecular weight between about 1,000,000 and about 1,300,000;
   about 0.1% to about 1% by weight of an alkali metal alkylbenzene sulfonate having between 8 and 12 carbon atoms in the alkyl chain in a ratio of about 2.5:1 to about 0.9:1 hydroxypropyl cellulose to alkali metal alkylbenzene sulfonate; and
   water containing less than about 2000 ppm total dissolved solids,
   said cellulose, alkylbenzene sulfonate and water forming a composition which substantially increases in viscosity upon the application of shear but decreases in viscosity when shear is stopped.

10. The composition of claim 9, wherein the ratio of hydroxypropyl cellulose to alkali metal alkylbenzene sulfonate is about 1.5:1 to about 0.9:1.

11. The composition of claim 9, wherein the water contains less than about 1000 ppm total dissolved solids.

12. The composition of claim 9, wherein the water contains less than about 500 ppm total dissolved solids.

13. The composition of claim 9, wherein the alkali metal alkylbenzene sulfonate is sodium octylbenzene sulfonate.

14. The composition of claim 9, wherein the alkali metal alkylbenzene sulfonate is sodium dodecylbenzene sulfonate.

15. The composition of claim 9, wherein the hydroxypropyl cellulose is present in a concentration of about 0.2% to about 0.7% by weight.

16. The composition of claim 9, wherein the alkali metal alkylbenzene sulfonate is present in a concentration of about 0.2% to about 0.4% by weight.

17. An aqueous shear-thickening composition, comprising:
   about 0.2% to about 1% by weight of hydroxypropyl cellulose having an average molecular weight between about 800,000 and 900,000;
   about 0.1% to about 1% by weight of an alkali metal dodecyl sulfate in a ratio of about 2.5:1 to about 0.9:1 of hydroxypropyl cellulose to alkali metal dodecyl sulfate; and
   water containing at least 15,000 ppm total dissolved solids.

18. The composition of claim 17, wherein the ratio of hydroxypropyl cellulose to alkali metal dodecyl sulfate is about 1.2:1 to about 0.9:1.

19. The composition of claim 17, wherein the water contains at least 20,000 ppm total dissolved solids.

20. The composition of claim 17, wherein the alkali metal dodecyl sulfate is sodium dodecyl sulfate.

21. The composition of claim 17, wherein the hydroxypropyl cellulose is present in a concentration of about 0.3% to about 0.7% by weight.

22. The composition of claim 17, wherein the alkali metal dodecyl sulfate is present in a concentration of about 0.3% to about 0.7% by weight.

* * * * *